Figure 2:
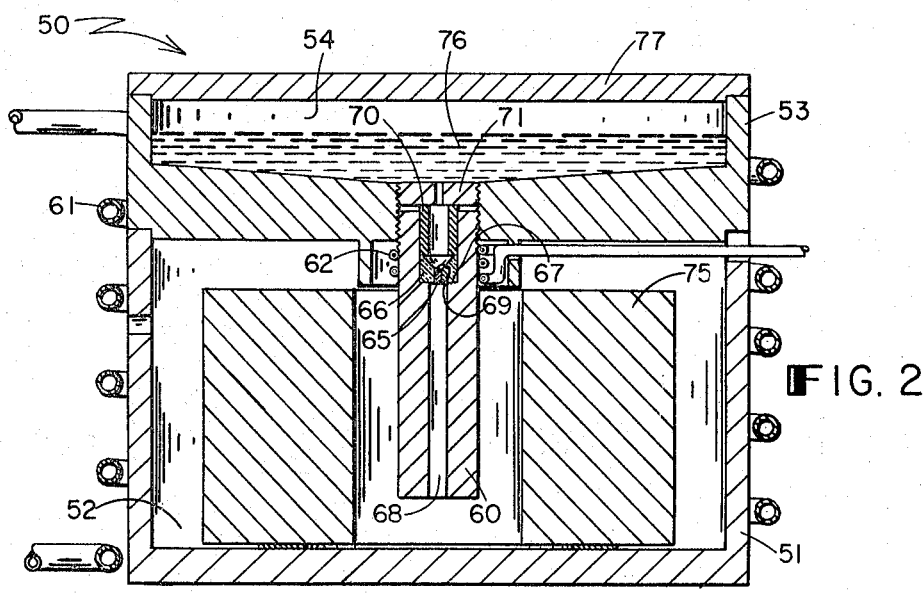

March 21, 1967 R. F. CHENEY ETAL 3,310,427
METHOD AND APPARATUS FOR INFILTRATING POROUS BODIES
Filed Jan. 29, 1963

RICHARD F. CHENEY,
LESLIE P. CLARE and
DONALD G. COOPER
INVENTORS.

BY David M. Keary

AGENT.

United States Patent Office 3,310,427
Patented Mar. 21, 1967

3,310,427
METHOD AND APPARATUS FOR INFILTRATING POROUS BODIES
Richard F. Cheney, Leslie P. Clare, and Donald G. Cooper, Towanda, Pa., assignors to Sylvania Electric Products Inc., a corporation of Delaware
Filed Jan. 29, 1963, Ser. No. 254,725
9 Claims. (Cl. 117—113)

This invention relates to the infiltration of porous bodies. More particularly, it is concerned with methods and apparatus for infiltrating or impregnating large porous bodies of refractory metals with metals havin glower melting points.

The impregnation of porous metal bodies with other metals by infiltrating a metal of lower melting point into a body of porous material is widely practiced in the metallurgical arts. In the production of electrical contact elements, metal powder, for example, tungsten, is fabricated into small porous bodies which are then infiltrated with a metal of higher electrical conductivity such as, for example, silver, copper, or nickel. However, the well known techniques applicable to the production of objects of this nature have not been found suitable for infiltrating large pieces so as to obtain a high degree of saturation of the porous piece with infiltrating material.

It is an object of the present invention, therefore, to provide an improved method of infiltrating porous bodies.

It is a more specific object of the invention to provide a method of infiltrating large bodies of porous metals, particularly those of a refractory nature, with metals of lower metlting point so as to obtain a high degree of saturation.

It is a further object of the invention to provide improved apparatus for use in the infiltration of porous bodies.

Briefly, in accordance with the foregoing objects of the invention a porous body is infiltrated with an infiltrating material having a lower melting point than the material of the body by superimposing a quantity of the infiltrating material in a zone immediately adjacent and above the porous body. The zone is separated from the body by means which include an interposed gate of a fusible material. The porous body and the infiltrating material are heated simultaneously to a temperature which is above the melting point of the infiltrating material but below the melting point of the porous body while the gate is maintained at a temperature below the melting point of the gate. The temperature of the gate is then raised above its melting point in order to melt the gate and to permit the molten infiltrating material to flow into contact with the heated porous body and to be drawn into the porous body by capillary action.

Apparatus according to the invention includes a first crucible section having a first chamber for containing the porous body which is to be infiltrated. A second crucible section adapted to be positioned above the first crucible section has a second chamber for containing the infiltrating material to be melted. The bottom of the second chamber is defined by a floor in the second crucible section. A channeling means in the floor has a passageway for connecting the second chamber with the first chamber. The channeling means is adapted to receive a gate of a fusible material in position blocking the passageway.

Figure 1:
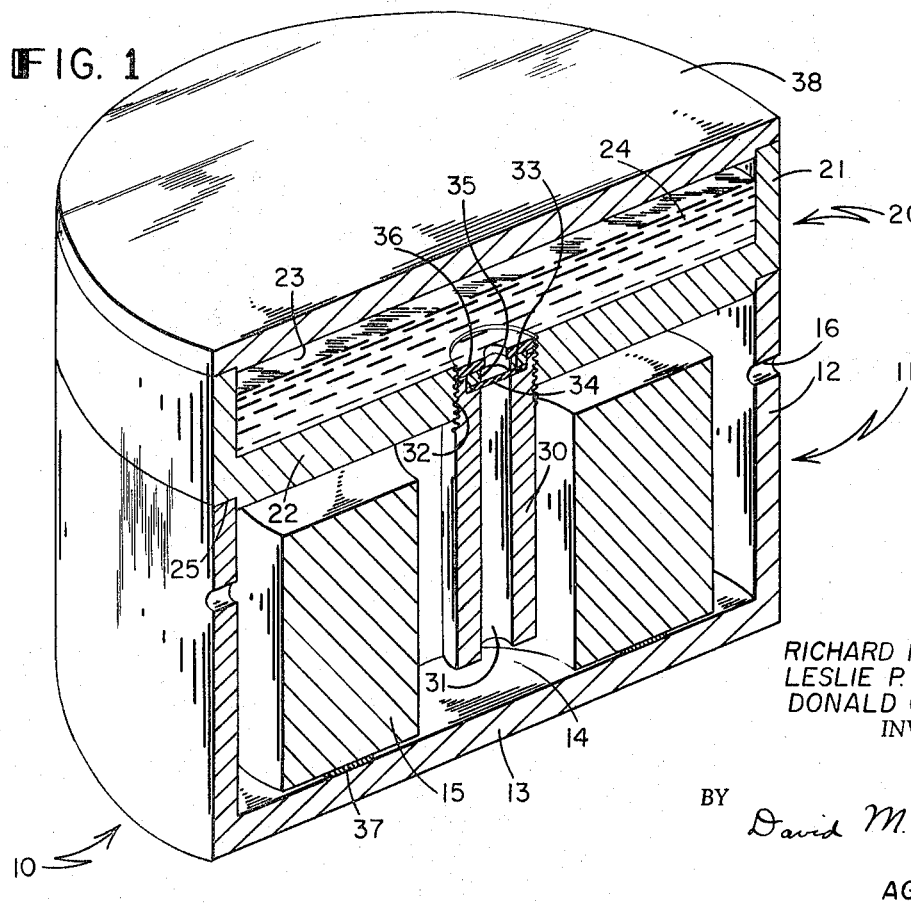

Additional objects, features, and advantages of the invention will be apparent from the following detailed discussion and the accompanying drawings wherein:

FIG. 1 is a perspective view in cross-section illustrating apparatus according to the invention, and FIG. 2 is an elevational view in cross-section illustrating a modified version of the apparatus of FIG. 1.

A crucible 10 for use in infiltrating a porous body according to a first embodiment of the invention is illustrated in FIG. 1. A first or lower section 11 of the crucible has side walls 12 and a floor 13 defining a chamber 14 which is adapted to contain a body 15 of a porous material to be infiltrated. Ports 16 in the side walls insure equalization of the pressure in the lower section with the atmosphere surrounding the crucible.

A second or upper crucible section 20 is adapted to be positioned above the lower section. The upper section has side walls 21 and a floor 22 defining a second chamber 23 for containing the infiltrating material 24. A groove 25 around the lower outer edge of the floor of the upper crucible section permits the upper section to be supported securely by the side walls of the lower crucible section.

The floor 22 of the upper crucible section is slightly dished to provide a low point. A downspout 30 having a vertical passageway 31 is threaded into an opening 32 in the floor located at the low point. A shoulder 33 in the downspout passageway 31 supports a thin flat diaphragm 34 of a suitable material to serve as a gate for blocking the passageway. The gate 34 is held in position by a washer 35 and an annular ring 36 threaded into the opening in the floor. The various parts of the crucible are of suitable materials which will withstand the temperature of the infiltrating treatment and which will not react with the molten infiltrating material. The gate 34 is of a material which does not react with the molten infiltrating material and which melts at a predetermined temperature above the melting point of the infiltrating material.

In carrying out the method of the invention using the apparatus of FIG. 1, the porous body 15 to be infiltrated is placed in the chamber 14 of the lower crucible section 11. For purposes of illustration the porous body is an annular piece of tungsten fabricated as by known powder metallurgy techniques and the material with which it is to be infiltrated is silver. The crucible material is carbon. The tungsten piece is placed on a spacer 37 of molybdenum in order to position it slightly above the crucible floor.

The upper crucible section 20 is then placed on the lower section. As illustrated in FIG. 1 the downspout 30 extends downward into the central cavity of the annular tungsten piece. The downspout may, of course, be positioned other than centrally of the crucible depending upon the configuration of the piece to be infiltrated. It may also be arranged in such a manner that the lower end of the passageway opens directly above a portion of the tungsten piece.

A gate 34 of a suitable metal having a melting point intermediate the melting points of the infiltrating material and the material of the porous body is placed in position in the downspout blocking the passageway 31. When infiltrating a tungsten piece with silver, a diaphragm of pure iron may be used. The diaphragm is held in position by a ceramic washer 35 and a carbon retaining ring 36.

The infiltrating material, silver in this example, is placed in the upper chamber 23. A cover 38 of carbon is placed over the upper chamber in order to prevent spattering and excess volatilizing of the silver during processing. The prepared crucible 10 is then placed in a suitable furnace and a protective atmosphere, as of hydrogen, is provided.

The chamber of the furnace is raised to a temperature intermediate to the melting point of silver and the melting point of the iron diaphragm. The crucible is held in the furnace chamber at this temperature for a sufficient period of time to melt the silver and insure that the molten silver and the tungsten piece are at a substantially uniform temperature. The temperature of the furnace is then raised above the melting point of the gate. The gate 34 melts, permitting the molten silver to flow downward through the passageway 31 in the downspout and into the lower chamber 14.

In the lower chamber the molten silver is drawn up into the heated porous tungsten piece by capillary action. Since there is substantially no temperature differential between the molten silver and all portions of the tungsten piece, the silver remains fluid and flows freely throughout the porous body, thus thoroughly impregnating it with silver. The crucible is then cooled to room temperature thereby solidifying the silver distributed throughout the tungsten piece.

A version of the crucible which is modified in several particulars is illustrated in FIG. 2. The crucible 50 includes a lower section 51 having a chamber 52 and an upper section 53 having a chamber 54 similar to the crucible of FIG. 1. A downspout 60 in the floor of the upper crucible section connects the upper chamber 54 with the lower chamber 52 via a passageway 68 normally blocked by a gate 65. A main induction heating coil 61 encircles the crucible. The crucible is made of a material such as carbon which serves as susceptor to be heated by R.F. energy from the coil. A supplemental coil 62 is arranged encircling the downspout in the region of the gate 65.

The downspout 60 illustrated in FIG. 2 is a variation of that shown in FIG. 1. An insert 66 of a ceramic material is supported on a shoulder 67 in the downspout passageway 68. The insert has a narrow bore or orifice 69 which restricts the size of the passageway. The orifice is blocked with a short length of thin wire 65 forced therein to serve as the gate. The wire is of a suitable fusible material having a predetermined melting point. The ceramic insert is held in position by a carbon sleeve 70 and threaded retaining ring 71.

When the modified downspout is employed, the molten infiltrating material flows into the lower chamber 52 at a slow rate after the wire gate is melted. The infiltrating material is thereby drawn up into the porous body as fast as it enters the lower chamber and flooding of the porous body is prevented. In this way simultaneous penetration from all surfaces which results in sealing off interior zones of the piece thereby blocking the escape of gases and preventing the entrance of infiltrating material does not occur. That is, more complete infiltration of the piece can be obtained when the molten infiltrating material is introduced into the lower chamber at a rate no greater than that at which it can be absorbed by the piece.

The supplemental coil 62 is arranged so as to encircle the fusible gate. It may be used to apply heat to the region of the gate, to cool the gate, or to first cool the gate and then heat the gate as will be explained hereinbelow.

In operating the apparatus of FIG. 2 according to one embodiment of the invention a short length of fusible wire 65 having a melting point intermediate that of silver and that of tungsten, for example stainless steel, is forced into the orifice 69 in the ceramic insert 66. A porous tungsten piece 75 is placed in the lower chamber 52. The upper crucible section 53 is then placed in position above the lower crucible section with the supplemental coil 62 in position encircling the downspout 60. Silver 76 is placed in the upper chamber 54 and the chamber covered with a lid 77.

The carbon crucible is placed in a protective hydrogen atmosphere and inductively heated by R.F. current through the main induction coil 61. The crucible is raised to a temperature between the melting point of silver and that of tungsten. This temperature is maintained for a period of time to insure that the temperature throughout the tungsten piece is as nearly as practicable uniform and at the temperature of the molten silver.

After these conditions have been attained, electrical current is passed through the supplemental coil 62 in order to raise the region of the gate 65 to a temperature above the melting point of the gate material. The gate 65 is thereby melted permitting the molten silver to flow through the unblocked restricted passageway 68 in the downspout and into the lower chamber. The silver is drawn up into the porous piece by capillary action resulting in a complete and uniform distribution of silver throughout the tungsten piece. The crucible is then permitted to cool and the impregnated tungsten piece is removed from the lower chamber.

In accordance with another embodiment of the invention a short length of fusible wire 65 having a melting point below or the same as silver is jammed into the orifice 69 in the insert 66. Silver may be used to advantage as the gate material, since when it is melted it will in no way contaminate the charge of infiltrating material. The crucible 50 is prepared as explained hereinabove with a tungsten piece 75 in the lower chamber 52, a charge of silver 76 in the upper chamber 54, and with the crucible in a non-oxidizing atmosphere.

As the temperature of the crucible is raised by R.F. current through the main induction coil 61, the region adjacent the gate is cooled by a cooling medium flowing through the supplemental coil 62. The upper and lower chambers are thus raised to a temperature between the melting points of silver and that of tungsten, while the gate remains below the melting point of silver. These conditions are maintained for a period of time sufficient to insure that the temperature throughout the tungsten piece is substantially uniform and is no less than that of the molten silver.

Next, cooling of the region adjacent the gate is discontinued as by stopping or reducing the flow of cooling medium through the supplemental coil 62. The temperature of the gate rises and the gate material melts, thus unblocking the passageway 68 and permitting the molten silver to flow into the lower chamber.

As a modification of the foregoing embodiment of the invention, when the cooling action is discontinued, RF energy may be applied to the supplemental coil. The additional heat necessary to raise the temperature of the gate above its melting point is thus applied directly to the region requiring it and the gate is melted more quickly. Alternatively, the flow of cooling medium through the coil may be continued while sufficient heat to overcome the cooling action and melt the gate is generated by RF current through the coil.

Although only two embodiments of apparatus according to the invention are illustrated in the drawings, various features may be taken from each embodiment so as to provide several possible variations. That is, the primary heating of the crucible may be done in a furnace chamber or by RF heating. The gate may be a thin flat diaphragm or a length of wire. Other combinations of the features disclosed are also obvious from the foregoing discussion.

In a typical example according to the invention an annular porous tungsten piece was infiltrated with the silver in apparatus of the general nature illustrated in FIG. 1 but having a modified downspout of the type shown in FIG. 2. The annular tungsten piece was approximately 11 inches outside diameter and 4 inches inside diameter by 6½ inches high. The tungsten piece weighed approximately 270 pounds and thus had a density which was approximately 77% of maximum theoretical density. The gate was a ¼ inch length of pure iron wire .040 inch in diameter. A charge of 44 pounds of silver shot was employed as the infiltrating material.

The infiltration process was carried out in a hydrogen atmosphere in a resistance heated electrical furnace. The center zone of the furnace chamber was maintained at a temperature 1460° C., and over a period of 4 hours the crucible was moved into the center. The crucible remained in this zone for a period of 3 hours. Over a period of 2 hours the temperature was raised until it reached 1550° C. This temperature was maintained for 4 hours. During this period the iron wire gate melted and the molten silver flowed into the lower chamber to be drawn into the porous tungsten piece by capillary action. Next, over a period of 3 hours the crucible was moved into a cool zone of the furnace, then held in the cool zone for approximately 4 hours before being removed from the furnace. Pieces treated in this manner were found to be substantially 100% saturated with silver.

What is claimed is:

1. The method of infiltrating a porous body with an infiltrating material having a lower melting point than the material of said body including the steps of
   superimposing a quantity of infiltrating material in a zone immediately adjacent and above the porous body to be infiltrated,
   said zone being separated from the porous body by means including an interposed fusible gate.
   heating simultaneously the porous body and the infiltrating material to a temperature above the melting point of the infiltrating material and below the melting point of the body while maintaining said gate at a temperature below the melting point of the gate, and
   raising the temperature of the gate above the melting point of the gate whereby the gate melts, permitting the molten infiltrating material to flow into contact with the heated porous body and to be drawn into the porous body.

2. The method of infiltrating a porous body with an infiltrating material having a lower melting point than the material of said body including the steps of
   positioning the porous body to be infiltrated in a first zone and positioning a quantity of infiltrating material in another zone superimposed above and isolated from the first zone with channeling means therebetween,
   said channeling means being blocked by a gate of fusible material,
   heating simultaneously the body and the infiltrating material associated therewith under the same conditions of environment and in said isolated zones to a temperature above the melting point of the infiltrating material and below the melting point of the body while maintaining said gate at a temperature below the melting point of the material of the gate, and
   raising the temperature of the gate above the melting point of the gate whereby the gate melts, unblocking the channeling means and permitting the molten infiltrating material to flow through said channeling means into contact with the heated porous body and to be drawn into the porous body.

3. The method of infiltrating a porous body with an infiltrating material having a lower melting point than the material of said body including the steps of
   positioning the porous body to be infiltrated in a first zone and positioning a quantity of infiltrating material in another zone superimposed above and isolated from the first zone with channeling means therebetween,
   said channeling means being blocked by a gate having a melting point intermediate to the melting points of the infiltrating material and the body,
   heating simultaneously the body and the infiltrating material associated therewith under the same conditions of environment and in said isolated zones to a temperature above the melting point of the infiltrating material and below the melting point of the gate, and
   raising the temperature of the gate above the melting point of the gate whereby the gate melts, unblocking the channeling means and permitting the molten infiltrating material to flow through said channeling means into contact with the heated porous body and to be drawn into the porous body.

4. The method of infiltrating a porous body with an infiltrating material having a lower melting point than the material of said body including the steps of
   positioning the porous body to be infiltrated in a first zone and positioning a quantity of infiltrating material in another zone superimposed above and isolated from the first zone with channeling means therebetween,
   said channeling means including a passageway blocked by a gate of a material having a melting point intermediate to the melting points of the infiltrating material and the material of the porous body,
   placing the body and the infiltrating material associated therewith in said isolated zones in a furnace region heated to a temperature intermediate to the melting points of the infiltrating material and the materal of the gate,
   maintaining the temperature conditions in said furnace region for a time sufficient to insure that the infiltrating material and all portions of the porous body are at a uniform temperature above the melting point of the infiltrating material, and
   raising the temperature of the furnace region above the melting point of the material of the gate whereby the gate melts, unblocking the passageway in said channeling means and permitting the molten infiltrating material to flow through said passageway into contact with the heated porous body and to be drawn into the porous body.

5. The method of infiltrating a porous body with an infiltrating material having a lower melting point than the material of said body including the steps of
   positioning the porous body to be infiltrated in a first zone and positioning a quantity of infiltrating material in another zone superimposed above and isolated from the first zone with channeling means therebetween,
   said channeling means including a passageway blocked by a gate of a material having a melting point intermediate to the melting points of the infiltrating material and the material of the porous body,
   applying heat simultaneously to the body and the infiltrating material associated therewith under the same conditions of environment and in said isolated zones to raise the body and the infiltrating material to a temperature above the melting point of the infiltrating material and below the melting point of the material of the gate,
   maintaining said conditions for a time sufficient to insure that the infiltrating material and all portions of the porous body are at a uniform temperature above the melting point of the infiltrating material, and
   applying additional heat only in the region of said gate to raise the temperature of the gate above the melting point of the material of the gate whereby the gate melts, unblocking the passageway in said channeling means and permitting the molten infiltrating material to flow through said passageway into contact with the heated porous body and to be drawn into the porous body.

6. The method of infiltrating a porous body with an infiltrating material having a lower melting point than the material of said body including the steps of
   positioning the porous body to be infiltrated in a first zone and positioning a quantity of infiltrating material in another zone superimposed above and isolated from the first zone with channeling means therebetween,
   said channeling means including a passageway blocked by a gate of a fusible material having a melting point below the melting point of the infiltrating material, applying heat to the body and the infiltrating material associated therewith under the same conditions of environment and in said isolated zones to raise the body and the infiltrating material to a temperature above the melting point of the infiltrating material and below the melting point of the material of the porous body and simultaneously removing heat from the gate to hold the temperature of the gate below the melting point of the material of the gate, maintaining said conditions for a time sufficient to insure that the infiltrating material and all portions of the porous body are at a uniform temperature above the melting point of the infiltrating material, and discontinuing the removal of heat from the gate to raise the temperature of the gate above the melting point of the material of the gate whereby the gate melts, unblocking the passageway in said channeling means and permitting the molten infiltrating material to flow through said passageway into contact with the heated porous body and to be drawn into the porous body.

7. The method of infiltrating a porous body with an infiltrating material having a lower melting point than the material of said body including the steps of positioning the porous body to be infiltrated in a first zone and positioning a quantity of infiltrating material in another zone superimposed above and isolated from the first zone with channeling means therebetween, said channeling means including a passageway blocked by a gate of the infiltrating material, applying heat to the body and the infiltrating material associated therewith under the same conditions of environment and in said isolated zones to raise the body and the infiltrating material to a temperature above the melting point of the infiltrating material and below the melting point of the material of the porous body and simultaneously removing heat from the gate to hold the temperature of the gate below the melting point of the infiltrating material, maintaining said conditions for a time sufficient to insure that the quantity of infiltrating material and all portions of the porous body are at a uniform temperature above the melting point of the infiltrating material, discontinuing the removal of heat from the gate, and applying heat to the region of the gate to raise the temperature of the gate above the melting point of the infiltrating material whereby the gate melts, unblocking the passageway in said channeling means and permitting the molten infiltrating material to flow through said passageway into contact with the heated porous body and to be drawn into the porous body.

8. Apparatus for infiltrating a porous body with infiltrating material having a lower melting point than the material of said body including in combination a first crucible section having walls and a floor defining a first chamber adapted to contain a porous body to be infiltrated, a second crucible section having walls and a floor defining a second chamber adapted to contain infiltrating material to be melted, said second crucible section being adapted to be positioned immediately adjacent and above the first crucible section with the floor of the second crucible section lying intermediate to the first and second chambers, a passageway in the floor of said second crucible section for connecting the second chamber with the first chamber, a fusible gate of a material having a melting point intermediate to the melting points of the infiltrating material and the porous body blocking said passageway, heating means for raising the temperature of said first and second chambers to a uniform temperature above the melting point of the infiltrating material and below the melting point of the gate, and supplementary heating means for raising the temperature only in the region of said gate to above the melting point of the material of the gate whereby molten infiltrating material from the second chamber flows through the passageway to the first chamber to be drawn into the porous body.

9. Apparatus for infiltrating a porous body with an infiltrating material having a lower melting point than the material of said body including in combination a first crucible section having walls and a floor defining a first chamber adapted to contain a porous body to be infiltrated, a second crucible section having walls and a floor defining a second chamber adapted to contain infiltrating material to be melted, said second crucible section being adapted to be positioned immediately adjacent and above the first crucible section with the floor of the second crucible section lying intermediate the first and second chambers, a passageway in the floor of said second crucible section for connecting the second chamber with the first chamber, a gate of a fusible material having a melting point no higher than the melting point of the infiltrating material blocking said passageway, heating means for raising the temperature of said first and second chambers to a uniform temperature above the melting point of the infiltrating material and below the melting point of the porous body, and cooling means for holding the temperature of the gate below the melting point of the gate material until the infiltrating material and the porous body have been heated to a temperature above the melting point of the infiltrating material.

References Cited by the Examiner
UNITED STATES PATENTS

| | | | |
|---|---|---|---|
| 1,930,646 | 10/1933 | Gray et al. | 117—113 |
| 2,289,334 | 7/1942 | Booth | 22—58 |
| 2,743,693 | 5/1956 | Schafer | 22—58 |
| 3,096,146 | 7/1963 | Coale | 264—328 |
| 3,103,719 | 9/1963 | Bishop et al. | 22—58 |

ALFRED L. LEAVITT, *Primary Examiner.*

A. ROSENSTEIN, *Assistant Examiner.*